United States Patent [19]

Proia

[11] Patent Number: 5,390,773
[45] Date of Patent: Feb. 21, 1995

[54] NON-SLIP BICYCLE CLUTCH

[76] Inventor: Cataldo Proia, 127 W. Embargo St., Rome, N.Y. 13440

[21] Appl. No.: 161,414

[22] Filed: Dec. 6, 1993

[51] Int. Cl.[6] .................................... F16D 41/06
[52] U.S. Cl. ..................... 192/45; 192/41 R; 192/64; 192/84 PM; 74/143; 280/253
[58] Field of Search .............. 192/45, 41 R, 47, 48.92, 192/64, 84 PM; 280/253; 74/143

[56] References Cited

U.S. PATENT DOCUMENTS

| | | | |
|---|---|---|---|
| 95,325 | 9/1869 | Coleman | 74/143 |
| 283,306 | 8/1883 | Warner | 74/143 |
| 611,557 | 9/1898 | Brooks et al. | 74/143 |
| 712,165 | 10/1902 | Willoughby | 74/143 |
| 740,156 | 9/1903 | Mendenhall | 74/143 |
| 2,181,665 | 11/1939 | Messamore | 192/64 |
| 2,186,816 | 1/1940 | Bernier | 192/64 X |
| 2,410,818 | 11/1946 | Grant, Jr. | 192/45 |
| 2,624,435 | 1/1953 | Stephenson | 192/84 PM X |
| 3,432,016 | 3/1969 | Vogt | 192/45 |
| 3,906,807 | 9/1975 | Trammell, Jr. | 74/6 C |
| 4,574,649 | 3/1986 | Seol | 192/64 X |
| 4,770,279 | 9/1988 | Shiozaki et al. | 192/84 PM X |
| 4,829,841 | 5/1989 | Ogawa | 74/143 X |

FOREIGN PATENT DOCUMENTS

| | | | |
|---|---|---|---|
| 127260 | 1/1948 | Australia | 280/253 |
| 255463 | 1/1913 | Germany | 74/143 |
| 4201773 | 7/1993 | Germany | 280/253 |
| 4-189694 | 7/1992 | Japan | 280/253 |
| 19970 | 3/1910 | United Kingdom | 280/253 |

Primary Examiner—Charles A. Marmor
Assistant Examiner—Andrea Pitts
Attorney, Agent, or Firm—George R. McGuire

[57] ABSTRACT

A clutch mechanism for use on a conventional bicycle which permits independent actuation of both pedals and provides a driving force through 100% of a pedal stroke. The clutch is generally comprised of a single, outer, cylindrical rotor which extends between the two pedals, and two internal rotors, respective to each pedal, positioned within the outer rotor. The internal rotors each include respective longitudinally extending, annularly spaced webs and longitudinally extending V-shaped portions integrally positioned between successive webs. In addition, magnets are attached to each rotor and positioned at the vortices of the V-shaped portions. The clutch further includes a set of cylindrical rods positioned between the two rotors which become wedgingly engaged between the magnets and the outer rotor when the pedal is actuated by a user of the bike. In addition, each pedal is attached to the frame of the bike via a spring which prohibits the pedal from being rotated a full 360°. After the pedal has been extended through a predetermined stroke, the resiliency of the spring causes the return of the pedal to its original position. This, in essence provides for 100% of the user's energy to be converted into useful work.

8 Claims, 3 Drawing Sheets

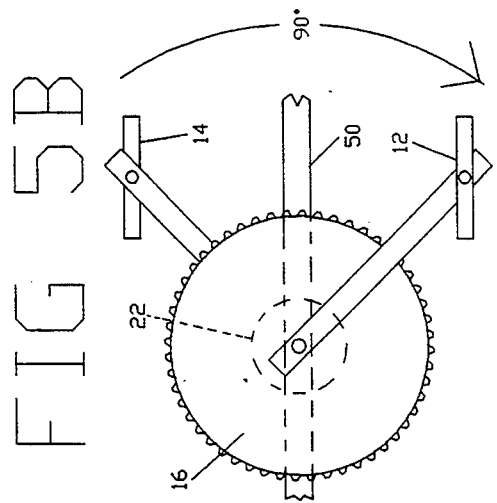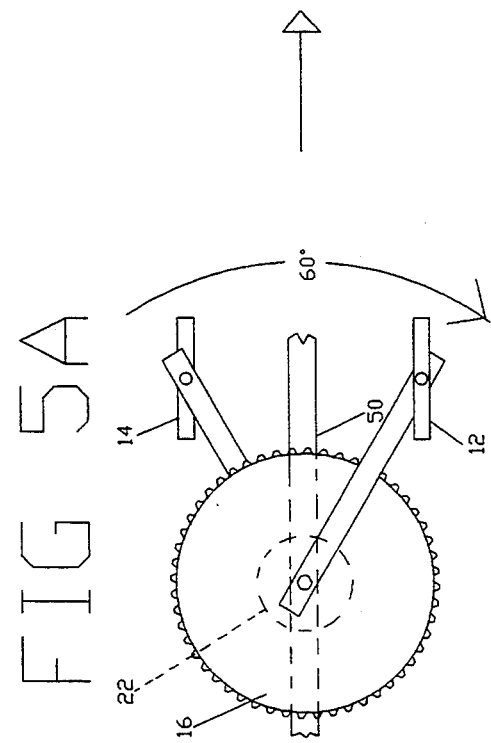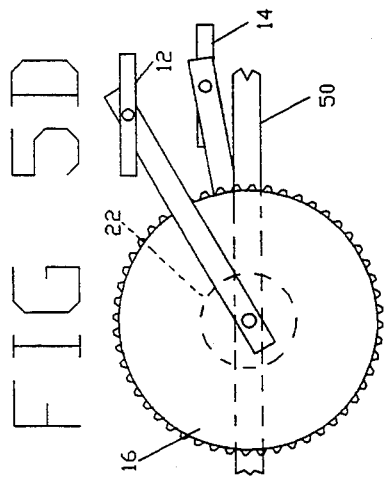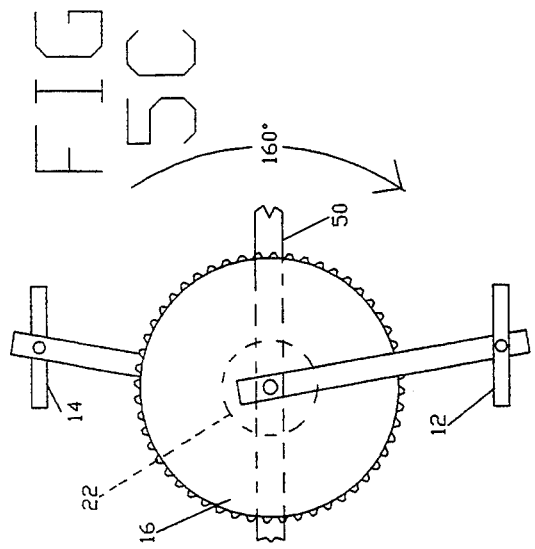

NON-SLIP BICYCLE CLUTCH

BACKGROUND OF THE INVENTION

The present invention generally relates to bicycle drive systems, and more particularly, to bicycle clutch mechanisms which permit the pedals to operate independently from one another.

In most existing bicycle designs, the two pedals operate in dependent relation to one another. The pedal cranks are fixedly, rotatably connected to a single sprocket having an elongated, endless chain linked drive train engaging the teeth thereof. The drive train, in turn, is held taut by wrappingly engaging a gear assembly positioned centrally adjacent, and in fixed relation to, the rear wheel of the bike. Once forcibly rotated by a user, the pedals rotate the sprocket, thereby causing the bike chain to correspondingly rotate. This motion of the chain, of course, causes the gear to rotate, thus rotating the rear wheel and propelling the bike forward.

In many bike designs, several gears are arranged on a gear shaft to provide various degrees of pedaling force to rotate the rear wheel and propel the bike. In addition, most of these bike drive systems include a slip mechanism which permits the user to stop pedaling, but continue coasting along. While coasting, a significant amount of drag force is applied to the wheel from the gearing assembly, thereby continuously, significantly decreasing the speed at which the bike is traveling.

Furthermore, with the above described bicycle drive system, there is a significant amount (i.e., between 5–15 degrees) of pedal travel from the position a user applies a force until the position where the force is applied to the wheel. This travel is caused by having to overcome the clutch slip force. This force is always different, therefore the amount of travel is unpredictable.

SUMMARY OF THE INVENTION

It is a primary object of the present invention to provide a bicycle drive system having pedals which apply drive forces independently of one another.

It is another object of the present invention to provide a bicycle drive system having pedals which instantaneously convert user exerted force into bicycle propelling force.

It is a further object of the present invention to provide a bicycle drive system having a clutch mechanism which produces minimal drag to the bicycle when in a coasting mode.

It is yet another object of the present invention to provide a bicycle drive system which does not wear or deteriorate when not in use.

It is still a further object of the present invention to provide a bicycle drive system in which gear changes can be made when the pedals are not in use.

In accordance with the foregoing objects and advantages, the present invention provides a bicycle drive system having a non-slip clutch mechanism which instantaneously delivers power to a wheel of the bike. The clutch mechanism is actuated through a user exerted force applied to the pedals, as with conventional bikes. The pedals are independently, operatively connected to respective clutch mechanisms, thereby permitting independent actuation of the two pedals.

The clutch mechanism is generally comprised of a single outer, cylindrical rotor which extends between the two pedals; respective internal rotors centrally positioned within the outer rotor and having three angularly, radially extending webs projecting outwardly therefrom; and respective sets of three cylindrical rods which wedge between the two rotors upon pedaling for effectively transferring rotary motion from the interior rotor to the exterior rotor. The exterior rotor, in turn, independently transfers the rotary motion to a conventional sprocket. The sprocket, of course, then transfers the motion to a gearing assembly via a conventional chain. The gearing assembly is attached to the rear wheel of the bicycle, thereby transferring the rotary motion to the wheel and propelling the bike forward.

If the user stops pedaling, there is simply no rotary motion to transfer from the inner rotor to the outer rotor, and if the user pedals backwards, the cylindrical rod becomes unwedged from between the two rotors, thereby effectively eliminating the transfer of rotary motion from the inner rotor to the outer rotor.

The pedal assembly of the present invention is connected to the bike frame through a spring which is fixedly anchored to the bike frame at one end, and connected to the pedal its opposite end. Therefore, upon actuation of a pedal, the spring becomes continuously stretched corresponding, of course, to the position of the pedal with respect to the frame. The spring becomes fully stretched (i.e., maximum tension to the spring) when the pedal has traveled approximately 175 degrees from its original position. At that point, or any point previous thereto, upon relaxation of the user exerted force, the pedal automatically returns to its original position in a rapid manner due to the recoiling of the spring. This particular system permits a biker to increase pedaling efficiency since only having to exert force to the pedal through half a conventional stroke. Furthermore, various pedal positioning arrangements can be made to accommodate various riding conditions.

BRIEF DESCRIPTION OF THE DRAWINGS

FIG. 5a is a side elevational view of the present invention showing the two pedals separated by about 60 degrees;

FIG. 5b is a side elevational view of the present invention showing the two pedals separated by about 90 degrees;

FIG. 5c is a side elevational view of the present invention showing the two pedals separated by about 160 degrees;

FIG. 5d is a side elevational view of the present invention showing the two pedals separated by about 10 degrees.

DETAILED DESCRIPTION

Figure 1:
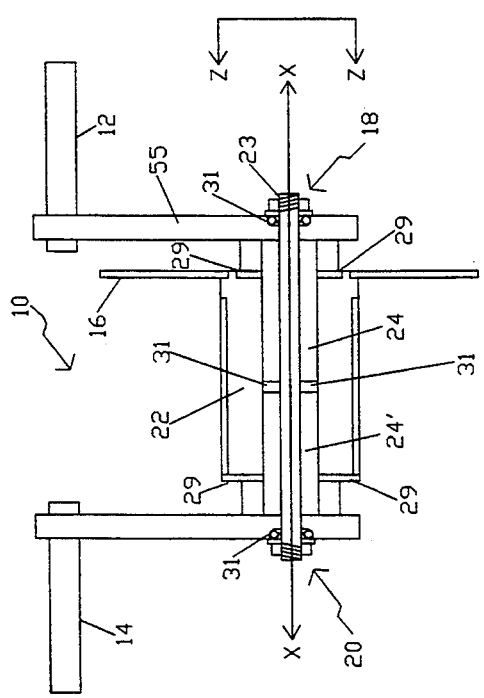
FIG. 1 is a front elevational view of the present invention.
Figure 2:
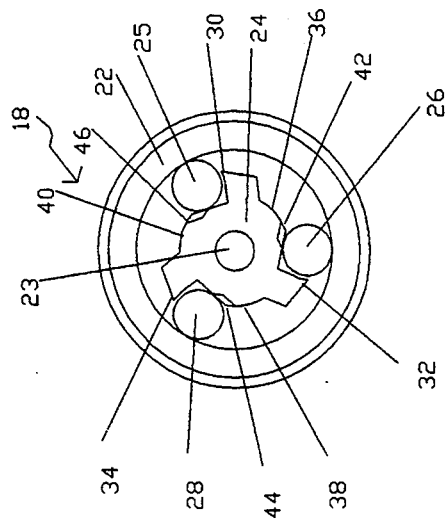
FIG. 2 is an enlarged side elevational view taken along line 2—2 of FIG. 1.
Figure 3:
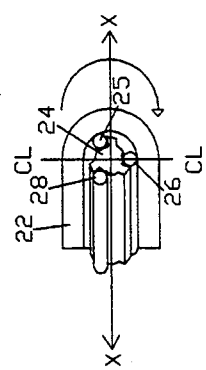
FIG. 3 is a perspective view of FIG. 2.

Referring now to the drawings wherein like reference numerals denote like parts throughout the various views, there is seen in FIG. 1 a bicycle transmission system denoted generally by reference numerals 10.

Transmission system 10 is partially comprised of two conventional pedals 12 and 14 positioned on opposite sides of a conventional sprocket 16. Unlike conventional bicycle designs, pedals 12 and 14 are connected to sprocket 16 through respective clutch assemblies 18 and 20. Sprocket 16 itself, on the other hand, operates in substantially the same manner as conventional bike sprockets; effectively transferring rotary motion to the rear wheel of a bike via an endless chain tautly extending between the sprocket and a gearing assembly which is fixedly connected to the rear wheel.

Clutch assemblies 18 and 20 include a common outer rotor 22 which extends between pedals 12 and 14 and is fixedly connected to sprocket 16. The other elements which comprise clutch assemblies 18 and 20, all of which are housed within rotor 22, are respective to each, but are substantially identical to one another. Therefore, for purposes of simplicity only the elements of clutch assembly 18 will be explained in detail.

Clutch assembly 18 includes outer rotor 22, a rotor 24 concentrically positioned within rotor 22, and three cylindrical rods 25, 26, and 28 positioned between rotors 22 and 24. Rotor 24 includes three, angularly, radially extending webs 30, 32, and 34 and three substantially V-shaped portions 36, 38, and 40 successively extending between webs 30, 32, and 34. Magnets 42, 44, and 46 are fixedly positioned at the vortices of respective V-shaped portions 36, 38, and 40. In addition, when pedal 12 is actuated cylindrical rods 25, 26, and 28 instantly become wedgingly retained between rotors 22 and 24 adjacent the inwardly angled surface of webs 30, 32, and 34, and magnets 42, 44, and 46, thereby effectively transferring any motion or rotor 24 to rotor 22 as will be more fully understood after further discussion.

Cylindrical rods 25, 26 and 28 are completely lubricated with conventional lubricating oil to maintain minimal friction. Furthermore oil seals 29 are appropriately placed in the assembly to keep oil from leaking out of the clutch assemblies. In addition, bearings 31 are also appropriately positioned between pedal shafts 55 and rotors 22 and 24 to permit smooth operation thereof.

Pedal 12 is connected to clutch assembly 18 through an operative, secure connection between pedal shaft 55 and rotor 24 (pedal 14 is connected to corresponding rotor 24' of clutch assembly 20). A bolt 23 passes through the entire assembly to retain pedals 12 and 14 to clutch assemblies 18 and 20. As previously described, once a user exerts a useful force on pedal 12 (or 14), the force is transferred to rotor 24. Rotor 24, in turn, responds to the user exerted force by rotating about its central, radial axis x—x. Immediately upon rotation of rotor 24, cylindrical rods 25, 26, and 28 become wedged between respective magnets 42, 44, and 46 and rotor 22, thereby translating the rotary motion of rotor 24 to rotor 22. Rotor 22, in turn, rotates sprocket 16 which activates a conventional chain and gearing assembly, thereby propelling the bicycle in a forward direction.

Since rotation of rotor 22 is completely dependent upon rotation of rotor 24, and pedals 12 and 14 are each independently connected to respective rotors 24, motion of one pedal does not automatically induce motion to the opposing pedal, as is the case with conventional bicycle designs. When pedals 12 and 14 are either not pedalled, or pedalled backwards, the inwardly angling surface of webs 30, 32, and 34 engage cylindrical rods 25, 26, and 28 effectively disengaging them from rotor 22, thus no force is transferred to or from rotor 22. A further feature of this clutch assembly is that when a pedal is pedalled either backwards or not at all, no wear is experienced by any of the elements.

Figure 6:
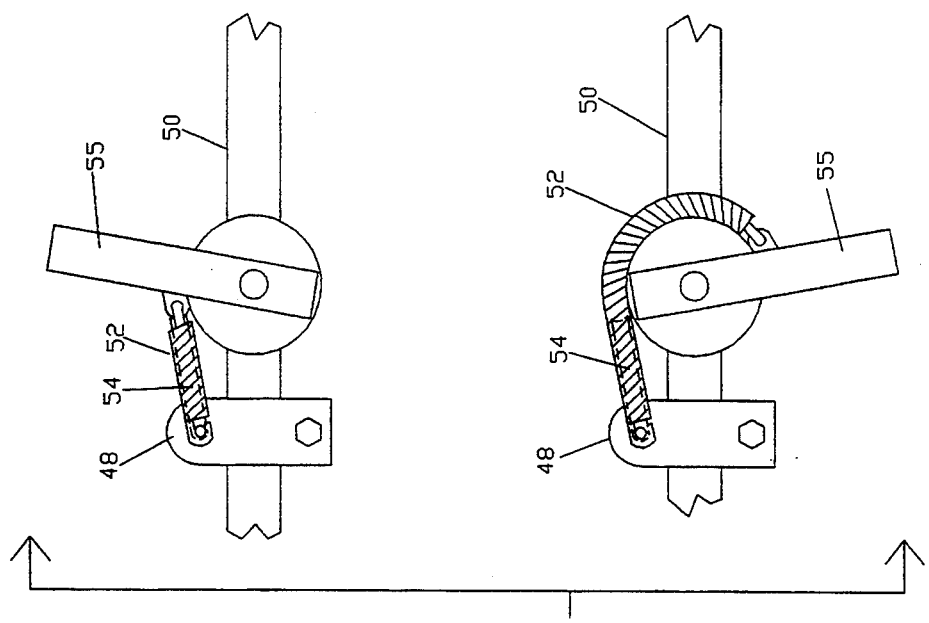
FIG. 6 is a side elevational view of the present invention showing, in particular, the connection between the pedal assembly and the bike frame.

Transmission system 10 is designed to increase user efficiency and to make a bicycle to which it is attached useable by disabled people, and attractive to bike racing enthusiasts as well as the casual rider. To accomplish these objectives, as seen in FIG. 6, a rigid bracket 48 is fixedly attached to a bike frame 50. Bracket 8 has fixedly anchored thereto, a spring 52 and a limiting bar 54 disposed within spring 52. The opposite end of spring 52 is anchored to a pedal shaft 55 to which pedal 12 or 14 is attached. Therefore, in whatever relation bracket 48 is positioned with respect to frame 50, spring 52 will hold pedal 12 or 14 in a corresponding position when pedal 12 or 14 is not being forced by a user. Limiting bar 54 extends through spring 52 and is of a length substantially equal to the length of spring 52 in its coiled form (i.e., unstressed form). Therefore, bar 54 acts as a stop to pedals 12 and 14.

When pedals 12 and 14 are forced downwardly, spring 52 becomes tensed and wraps around the outer surface of rotor 22. Pedals 12 and 14 can be rotated approximately 180 degrees until spring 52 reaches maximum tension. At that point, or any point previous thereto, upon relaxation of the user exerted force to pedals 12 and 14, pedals 12 and 14 automatically return to their original position (i.e., in abutting relation to bar 54) due to the recoiling of spring 52. Therefore, the pedalling efficiency is increased considerably over conventional bike designs since a user only has to exert energy on the pedals' downstroke.

As previously mentioned, pedals 12 and 14 may be positioned in varying relation to frame 50 depending upon what the particular desired results of pedalling are. In FIG. 5a, pedals 12 and 14 are seen to be positioned such that each pedal stroke is about 60 degrees. This particular arrangement would be useful when climbing steep hills, as there is not too much pressure required on either leg at any one time.

FIG. 5b shows a pedal arrangement which would be desired for casual riding. Each pedal stroke is approximately 90 degrees which is adequate when riding on substantially level ground.

FIG. 5c shows pedals 12 and 14 in their maximum travel positions. Approximately 160 degrees of travel constitute a full pedal stroke with this arrangement. Positioning the pedals in this particular arrangement is useful for racing and fast riding, due to power being supplied over a longer stroke.

FIG. 5d shows a useful pedal arrangement for disabled people, or those who have problems in one particular leg. Pedals 12 and 14 are positioned at different locations relative to the frame to accommodate any ailment, thereby not requiring a limb to move in a manner which is uncomfortable or impossible for the individual.

Figure 4:
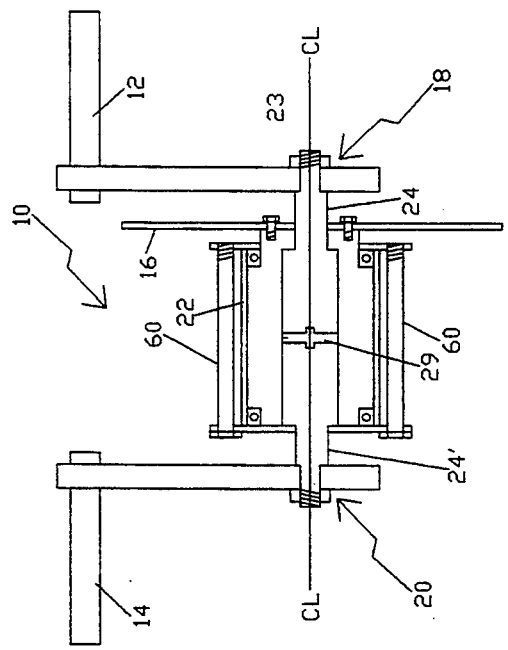
FIG. 4 is a front elevational view of the present invention showing alternate means for connecting pedals to a transmission system.

Transmission system 10 may be manufactured as a single integral arrangement of parts as shown in FIG. 1, or it may be manufactured as several individual parts connected to one another by a plurality of nuts and bolts 60 as shown in FIG. 4. In either case, it is a simple task to replace the transmission systems on existing bikes with the one disclosed herein, as well as being possible to place it on newly manufactured bicycles.

It is certainly worthwhile to note that employment of the present invention on a bicycle eliminates the need for a clutch to be attached to the rear wheel of the bike (conventional multi-speed bikes include a clutch on the rear wheel which stops the chain from turning when in a coasting mode). To change gears on a multi-speed bike, it is necessary for the chain to be in motion, thus the only time a gear change can be made on a conventional bike is while it is being pedalled. But, with the present invention being attached to a multi-speed bike, it is possible to change gears while not pedalling since whenever the bike is in motion, the chain is also in motion (due to the elimination of the rear wheel clutch).

Although the above described transmission assembly is disclosed for a bicycle having only one sprocket, the assembly may be used on any type of bike (i.e., 10 speed, mountain type, 18 speed, etc.). Furthermore, the above described system can be mounted on existing bicycles as well as on newly manufactured bicycles. The spirit and scope of this patent should be appreciated as defined in the following claims.

What is claimed is:

1. A clutch assembly for use on a bicycle having a sprocket, first and second pedals positioned on opposite sides of said sprocket and a bike frame, said assembly comprising:
    a) a hollow, first rotor extending between said first and second pedals and being fixedly attached to said sprocket;
    b) a second rotor positioned at least partially within said first rotor and being securely attached to said first pedal whereby said first pedal transfers rotary motion to said second rotor in correspondence to said first pedal experiencing a user exerted force causing said second pedal to partially rotate in a forward direction;
    c) a third repositioned at least partially within said first rotor and being securely attached to said second pedal whereby said second pedal transfers rotary motion to said third rotor in correspondence to said second pedal experiencing a user exerted force causing said second pedal to partially rotate in a forward direction;
    d) means for transferring said rotary motion of said second rotor to said first rotor and;
    e) said second and third rotors including:
        i) respective first and second pluralities of annularly spaced, angled, radially extending webs;
        ii) respective first and second pluralities of V-shaped portions extending between each successive said plurality of webs; and
        iii) respective first and second pluralities of magnets attached to said second and third rotors, said magnets positioned at the vertices of said V-shaped portions.

2. The invention according to claim 1 wherein said first rotary motion transfer means includes at least two first cylindrical rods positioned between said first and second rotors, whereby said at least two cylinders are wedged between said first magnets and said first rotor when said user exerted force is applied to said first pedal.

3. The invention according to claim 1 further comprising second means for transferring said rotary motion from said third rotor to said first rotor.

4. The invention according to claim 3 wherein said second rotary motion transfer means includes at least two second cylindrical rods positioned between said first and third rotors, whereby said at least two cylinders are wedged between said second magnets and said first rotor when said user exerted force is applied to said first pedal.

5. The invention according to claim 1 further comprising means for automatically returning said first and second pedals to a predetermined position.

6. The invention according to claim 5 wherein said pedal return means comprise:
    a) first and second brackets fixedly attached to said bike frame respectively adjacent said first and second pedals; and
    b) respective first and second springs having respective first and second opposite ends, said first ends being securely anchored to said respective brackets and said second ends being respectively, securely anchored to said first and second pedals, whereby when said springs are untensed, said springs respectively cause said first and second pedals to be positioned in a first predetermined orientation with respect to said frame, and when said first and second pedals experience said user exerted force, said springs become tensed, and upon relaxation of said user exerted force, said springs recoil to their untensed positions, thereby returning said first and second pedals to said first predetermined orientation with respect to said frame.

7. The invention according to claim 6 further comprising respective first and second elongated bars having respective first and second ends, said first and second bars first ends being respectively, securely anchored to said first and second brackets, said bars being respectively disposed within said first and second springs and respectively abutting said first and second pedals when said first and second pedals are positioned in said first predetermined orientation with respect to said frame.

8. Apparatus for use with a bicycle having first and second pedals operable between first and second positions, respectively, and a frame, said apparatus providing means for automatically returning said first and second pedals to said first position, said apparatus comprising:
    a) first and second brackets fixedly attached to said bike frame respectively adjacent said first and second pedals;
    b) respective first and second springs having respective first and second opposite ends, said first ends being securely anchored to said respective brackets and said second ends being respectively, securely anchored to said first and second pedals, whereby when said springs are untensed, said springs respectively cause said first and second pedals to be positioned in a first predetermined orientation with respect to said frame, and when said first and second pedals experience a user exerted force, said springs become tensed, and upon relaxation of said user exerted force, said springs recoil to their untensed positions, thereby returning said first and second pedals to said first predetermined orientation with respect to said frame; and
    c) first and second elongated bars having respective first and second ends, said first and second bars first ends being respectively, securely anchored to said first and second brackets, said bars being respectively disposed within said first and second springs and respectively abutting said first and second pedals when said first and second pedals are positioned in said first predetermined orientation with respect to said frame.

* * * * *